United States Patent

[11] 3,611,369

| [72] | Inventor | Hugh T. Maguire<br>Philadelphia, Pa. |
|------|----------|-------------------------------------|
| [21] | Appl. No. | 828,319 |
| [22] | Filed | May 27, 1969 |
| [45] | Patented | Oct. 5, 1971 |
| [73] | Assignee | Burroughs Corporation<br>Detroit, Mich. |

[54] QUANTIZER SYSTEM WITH ADAPTIVE AUTOMATIC CLUTTER ELIMINATION
14 Claims, 16 Drawing Figs.

| [52] | U.S. Cl. | 343/7 A, 343/5 DP |
|------|----------|-------------------|
| [51] | Int. Cl. | G01s 7/28 |
| [50] | Field of Search | 343/5 DP, 7A |

[56] References Cited
UNITED STATES PATENTS

| 3,386,091 | 5/1968 | Wilmot et al. | 343/5 DP |
| 3,487,405 | 12/1969 | Molho et al. | 343/5 DP X |
| 3,503,068 | 3/1970 | Yamauchi | 343/5 DP X |
| 3,505,637 | 4/1970 | Abruzzo | 343/7 RS X |

Primary Examiner—T. H. Tubbesing
Attorney—Carl Fissell, Jr.

ABSTRACT: The present disclosure describes a quantizer system applicable to radar video data processing which includes automatic clutter elimination in each of a plurality of annular sectors comprising the entire area under surveillance. The basic concepts disclosed herein are also applicable to other surveillance and detection systems, including those using phase arrayed radars, sonar and optical systems.

INVENTOR
HUGH T. MAGUIRE

INVENTOR.
HUGH T. MAGUIRE

BY Francis A. Varallo
AGENT

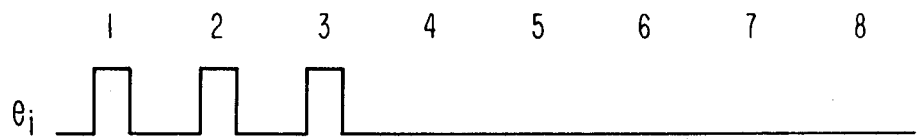
_Fig.8a_
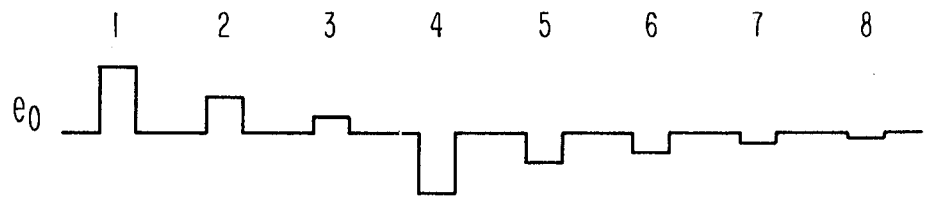
_Fig.8b_
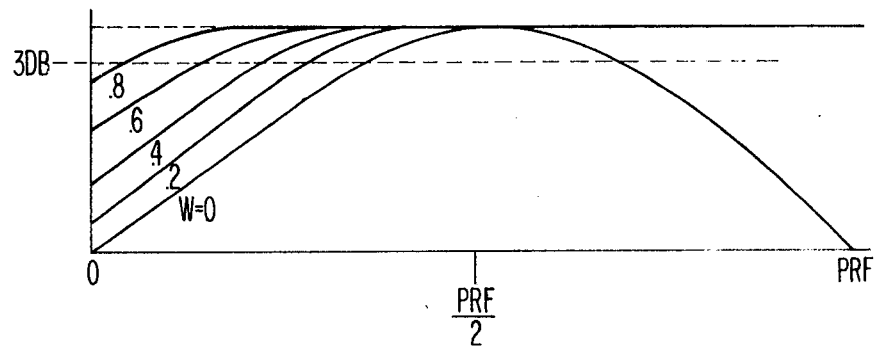
_Fig.9_
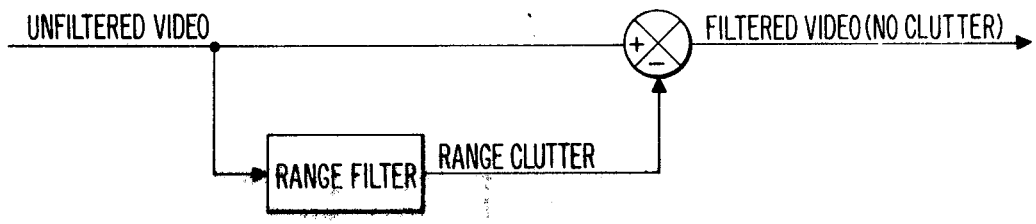
_Fig.10_
INVENTOR.
HUGH T. MAGUIRE

INVENTOR.
HUGH T. MAGUIRE

QUANTIZER SYSTEM WITH ADAPTIVE AUTOMATIC CLUTTER ELIMINATION

BACKGROUND OF THE INVENTION

The present invention relates generally to electronic devices for producing quantized video signals in radar video data processing systems.

A persistent problem in radar systems is the elimination of clutter from radar returns without the degradation of target detection. Clutter originates from a number of sources, both manmade and natural; buildings, hills and forests are but a few examples of such sources. Moreover, the clutter spectrum over land and water areas, and land/sea interface areas, varies considerably.

Since clutter can cause an excessive number of false targets in the radar detection system, it must be removed from the radar information. Although methods of clutter elimination are known, the need has existed for a compact, reliable system which would enhance target detection by automatically adapting to a radically changing clutter environment. The present invention meets this requirement.

SUMMARY OF THE INVENTION

The clutter elimination technique of the present invention is based upon the utilization of a quantizer system which subdivides the entire area under surveillance into a predetermined number of annular sectors, each having a separately controllable clutter eliminator. The clutter history for each sector is accumulated and stored in memory in a manner which permits a two-dimensional, range and azimuth, clutter model to be identified. Having identified the clutter environment within each sector, the type video, and the filters and gains required for optimum performance in each sector are automatically switched in and used on each scan of the radar through each sector.

The purpose of dividing the area under surveillance into sectors is to stop or at least slow down the variations in the clutter situation due to the scanning antenna. Since the clutter varies radically as a function of range and azimuth, it is impossible to design a system to deal effectively with the extreme conditions that can exist over the entire area. Thus, the use of sectors, each a small piece of the area under surveillance, has the effect of removing these wide clutter variations. With the clutter condition held constant, or at least made slowly varying, within the sector, the optimum control setting for the sector can be learned by the adaptive control units within the quantizer system.

In accordance with the invention, the quantizer system sensitivity is adjusted automatically within each of the sectors in response to a command from either the control panel or a command from the track-while-scan computer. The latter operation is a feature which incorporates the quantizer system and the tracking computer in a closed loop. With feedback information from the computer, it is possible to optimize the overall system performance. For example, the tracking computer can generate commands to the quantizer system which cause it to increase its sensitivity in a small area containing a target with low signal-to-noise ratio. This computer feedback function causes the probability of a false alarm and the probability of detection to be controlled by the quantizer such that the computer operates near its full capacity. However, it assures that the computer will not receive more messages than it can process.

The quantizer system utilizes a continuous estimate of the mean of the residual clutter plus noise, that is, the quantizer estimates the parameter which defines the probability density function of the incoming video. This parameter is the mean. This estimate of the mean is obtained by weighting the video signal ahead and behind in range and only behind in azimuth in the neighborhood of the range cell being quantized. By weighting the video only in the neighborhood of the range cell being quantized, an accurate current estimate of the mean of the distribution of the video is obtained.

The quantizer system learns (adapts) over a period of several sweeps through the sector, and selects that factor by which the estimate of the mean as described hereinbefore, must be multiplied in order to provide the required slicer thresholds. For slicer A, this factor varies in response to the command from the computer which was inserted for the sector. If no command has been received from the computer, the manual command from the quantizer control panel is used. This factor automatically provides the desired correction to obey the command to the sector. The factor is checked by counting the number of binary ONE's produced at the output of slicer A within the sector and comparing this count to the count required by the command to the sector. This factor, which can be modified several times on one scan through the sector, is stored in memory when the sector is exited, and is not used again until the same sector, which is defined in terms of range and azimuth, is entered on the following radar scan. When the sector is entered on the succeeding scan, the factor is fetched and used as the initial setting for the sector.

Any one of a plurality of azimuth filter values can be selected for use in each sector. The function of the azimuth filter is to remove peaks in the video spectrum which are characteristic of clutter. These peaks center about zero hertz and at multiples of the pulse repetition frequency. The azimuth filter is a comb filter which is designed for the sector by adjusting its time constant to the optimum value for that sector. The objective of having the azimuth filter selected by the adaptive feedback control loop in each sector is to boost the signal-to-noise ratio on all radar targets within each sector to the maximum possible value. The selection of the azimuth filter is controlled by obtaining an estimate of the correlation in azimuth of the slicer B output. This estimate is obtained by accumulating a count of the pairs of ONE's and ZERO's at the slicer B output. A pair exists when the present output matches the output produced at the same range on the previous sweep. Since targets within the sector could bias the pairs count, a sampling method is used to reduce this effect. This pairs count, which is a measure of the correlation in azimuth, is compared to two thresholds. If the count is within these thresholds, the azimuth filter is not changed; otherwise, it is modified. As with all the controls used in the quantizer system, the control setting existing at the time of exit from the sector, is stored in memory, and is used when the sector is entered on the following scan.

There are three types of video inputs which may be available to the quantizer system, namely, matched filter, single-cancelled and double-cancelled video. The system automatically selects the type of video which, in combination with the selected azimuth filter, produces the desired correlation measurements at the output of slicer B. As mentioned hereinbefore, an estimate of the mean is obtained by the weighting of the video in the neighborhood of the range cell being quantized. This weighting can be varied as required by the clutter state in each sector. The weighting is controlled by the selection of a range filter value from a plurality of such values. The selection of the range filter is controlled by an adaptive feedback control loop similar to the azimuth control loop. Accordingly, an estimate of the correlation in range is obtained, and this estimate is compared to two thresholds. If the estimate falls within the thresholds the range filter is not modified, otherwise another range filter is selected. At the end of the sector this range filter value is stored until the sector is again entered.

It is another feature of the invention that within each sector either the range filter or azimuth filter, or both, can be altered for brief periods corresponding to brief radical changes in the clutter situation. This action is controlled by a clutter-jump sensor. The purpose of this sensor is to improve the quantizer performance by speeding the response of the range and azimuth at the edges of clutter patches which are much greater in magnitude than the clutter or noise over most of the sector. In addition to providing improved performance on the edges of strong clutter patches the clutter-jump sensor reduces the biasing of the controls which have been learned for the sector and which are stored in memory.

Other features of the invention will be apparent in the detailed description which follows.

DESCRIPTION OF THE DRAWINGS

FIGS. 8a and 8b illustrate respectively the input signal and output waveform for the azimuth filter under an operating condition midway between no attenuation and full attenuation;

FIG. 9 is a graph of the filter characteristic for a practical azimuth filter;

FIG. 10 illustrates in simplified form, the function of the range filter of the present quantizer system;

DESCRIPTION OF THE PREFERRED EMBODIMENT

Figure 1:
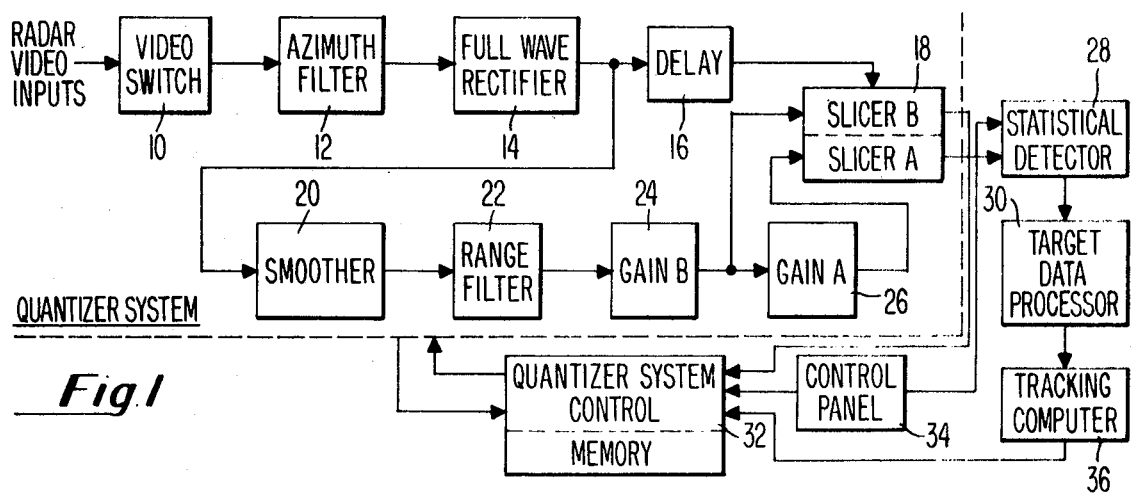
FIG. 1 is a simplified functional block diagram illustrating significant portions of the quantizer system of the present invention and presented in the environment of an actual operative radar automatic detection system.

Referring to FIG. 1, the radar video signal selected for processing and appearing at the output of the Video Switch 10 is applied to the Azimuth Filter 12 where it is weighted with the Azimuth Filter output that was stored at this range on the previous sweep. The passband of any given Azimuth Filter is established by the relative weight given the present input video and the output of the filter at the same range cell on the previous sweep. This may be expressed by the equation:

$$AI(m)+BO(m-1)=O(m)$$

where $I(m)$ is the present sweep; $O(m-1)$ is the output at the same range cell on the previous sweep; A, B are weights which determine the time constant and frequency response of the filter; $O(m)$ is the output of the filter on the present sweep.

Thus, the Azimuth Filters are selected simply by assigning the proper values to A and B.

The Bipolar output of the Azimuth Filter 12 is rectified in Full-wave Rectifier 14 and delayed a predetermined amount by Delay 16. The delayed unipolar video signal is then applied to the Slicers 18. Since, video at the output of delay 16 is considered to occur at the present time, video stored in this delay is, in effect, future video relative to the video being quantized by the slicers.

The output of the Full-Wave Rectifier 14 is also applied to the Smoother 20, which is similar in performance to the Azimuth Filter. The Smoother time constant is controlled by the Clutter Jump Sensor 63 (FIG. 4) which selects one of two time constants.

The video signal is then applied to the Range Filter 22 where the weighting in range is accomplished by appropriately weighting the outputs of a tapped delay line and by the use of conventional RC filters. In this manner the Range Filter 22, in combination with delay 16, introduces symmetrical weighting on both the future and past video relative to the range cell being quantized by the slicers. In operation, the relative weight assigned to each tap of the delay line is determined by the time constant for which the filter is designed. For example, if the time constant of the Range Filter is to be T microseconds, then the weighting of the delay line taps must be proportional to:

$$e^{1t/T}$$

where $t$ is the displacement in time from the time considered as the present. By inserting into the last-mentioned equation the time displacement of the taps of the delay line from the display line output, the relative weight to be assigned to each tap is determined.

Since the Range Filter 22 uses future as well as past values of the input video relative to the range cell being quantized, it is a zero phase shift filter. Use of this hybrid transversal filter results in more accurate estimates of the clutter levels than could be achieved by conventional filtering methods.

The filtered output signal from the Range Filter 22 is applied to the gain controls, GAIN B and GAIN A. GAIN B multiplies the filtered video by a factor which results in the proper clip level, or first threshold being applied to Slicer B of the Slicers 18.

The output of Slicer B is used to generate a constant rate of binary ONE's for use in obtaining estimates of the correlation of the incoming video. Correlation may be defined as a measure of the dependence of events; thus, the slicer B is sampled in azimuth to obtain an estimate of the correlation in azimuth by counting the pairs of ONE's generated at a given range cell on adjacent sweeps and Slicer B is also sampled in range, to obtain an estimate of the correlation in range by counting the number of paired ONE's separated by a single range cell. Slicer A is sampled to obtain an estimate of "$p_n$," the probability of a ONE due to noise, by counting the number of ONE's generated on a sweep through the sector. These estimates are compared to thresholds and decisions are made, based on these comparisons, as to what filter or gain changes must be made to improve the performance of the system.

The video output of Slicer A is applied to the Statistical Detector 28 where it is analyzed for the presence of possible targets. In an operative system, a two-stage detector has been used. The first stage is a short term sequential observer which signals the beginning of target illumination. This stage is followed by a long term integrator assigned on as "as needed" basis to range cells in which short term outputs have been detected. This combination of stages minimizes storage requirements and has a very high degree of detection sensitivity.

The Target Data Processor 30 serves a number of functions in an actual operative system, among them the separation of interleaved targets, computation of target height from multiple returns, and coordinate conversion from radar polar coordinates to rectangular coordinates.

The Tracking Computer 36 correlates the reports received from the Target Data Processor with existing tracks, initiates new tracks, or terminates tracks as required. The Tracking Computer is programmed to determine track validity and prediction of the next positions of the track.

The Quantizer System Control 32 provides for the selection of video, filters, and gains in the Quantizer System. In a "closed loop" mode of operation the gains, filters, and video are automatically selected in response to commands originated either at the Control Panel 34 or in the case of commands to regulate the Slicer A output to a particular value, from the Tracking Computer 36. In an "open loop" mode of operation, the video, gain and filters are selected manually at the Control Panel and are used in all the sectors of the area under surveillance. In performing its functions, the Quantizer System Control 32 is assumed to include various counters for timing and control applications and for use in connection with the observation of slicer outputs, and a memory for storing parameters such as filter values, video type and "$p_n$" for each of the sectors. It is the Quantizer System Control 32, which through the use of its clock timers and counters, performs the subdivision of the area under surveillance into a plurality of sectors. The location of any given sector is defined in terms of its azimuth and range. In azimuth, commencing with a reference point such as the north point, a count is kept by the Quantizer System Control 32 of the number of radar sweep triggers which have occurred as one complete scan of the surveillance area is accomplished. The count at any given time establishes the azimuthal angle of the area being swept measured in a clockwise direction from the reference point. In range, clock timing pulses are generated by the Quantizer System Control 32 at a predetermined repetition frequency. A count of these pulses during each radar sweep, establishes at any given time, the range of the area being swept. The counters and memory are further assumed to be of conventional design, and their actual configuration which may be dependent upon the particular system requirements, are well within the skill of the circuit designer.

The function of the Control Panel 34 is that a number of operating modes can be selected, "$p_n$" commands can be inserted, and the command, estimates, and controls for any sector can be selected for display on the control panel indicator. If the command source switch on the Control Panel 34 is set to the mode which accepts commands from the Tracking Computer 36, the computer can address any of the sectors and insert a "$p_n$" command to modify the sensitivity in that sector.

Figure 2:
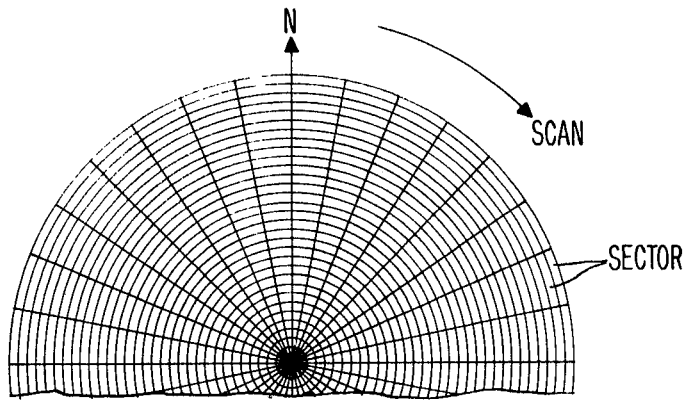
FIG. 2 illustrates the subdivisions of the radar surveillance area into a plurality of sectors.

FIG. 2 depicts the area under surveillance which has been divided into sectors. The number of sectors may be chosen in accordance with particular operating requirements—2,048 sectors have been employed in an actual operative system, although twice this number of sectors is feasible. Each sector has a combination of control settings representing any one of 16 Azimuth Filters; 16 Range Filters; 32 Gain settings; and three types of Video inputs. In view of the large number of control settings, it is possible for each of the 2,048 sectors to have a different combination of settings.

Figure 3:
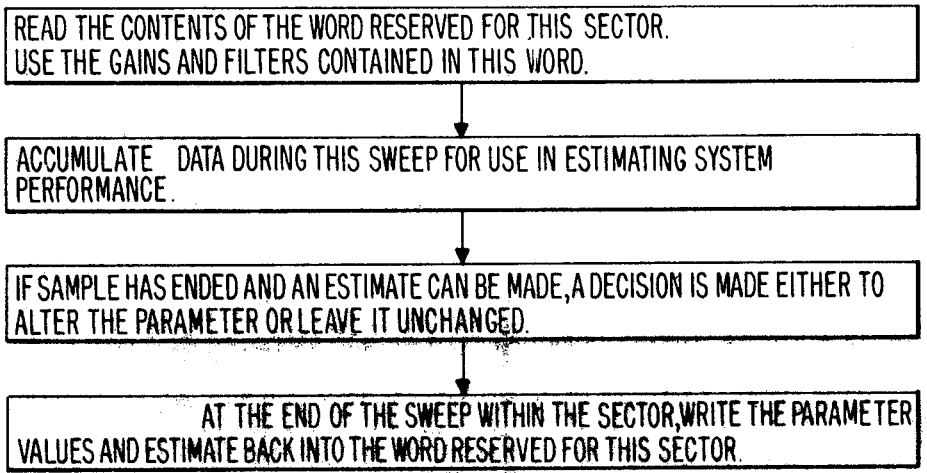
FIG. 3 is a flow chart for the operations performed in a sector.

FIG. 3 indicates the basic operations which are performed on each sweep through any sector. At the first range cell (defined as a predetermined increment of range in nautical miles) in the sector, the parameter settings which have been learned by this sector are read out of memory and used. Estimates are made during the sweep through the sector; controls are altered based upon the outcome of the samples; and at last range cell in the sector, the modified data is written into the word reserved for this sector.

Figure 4:
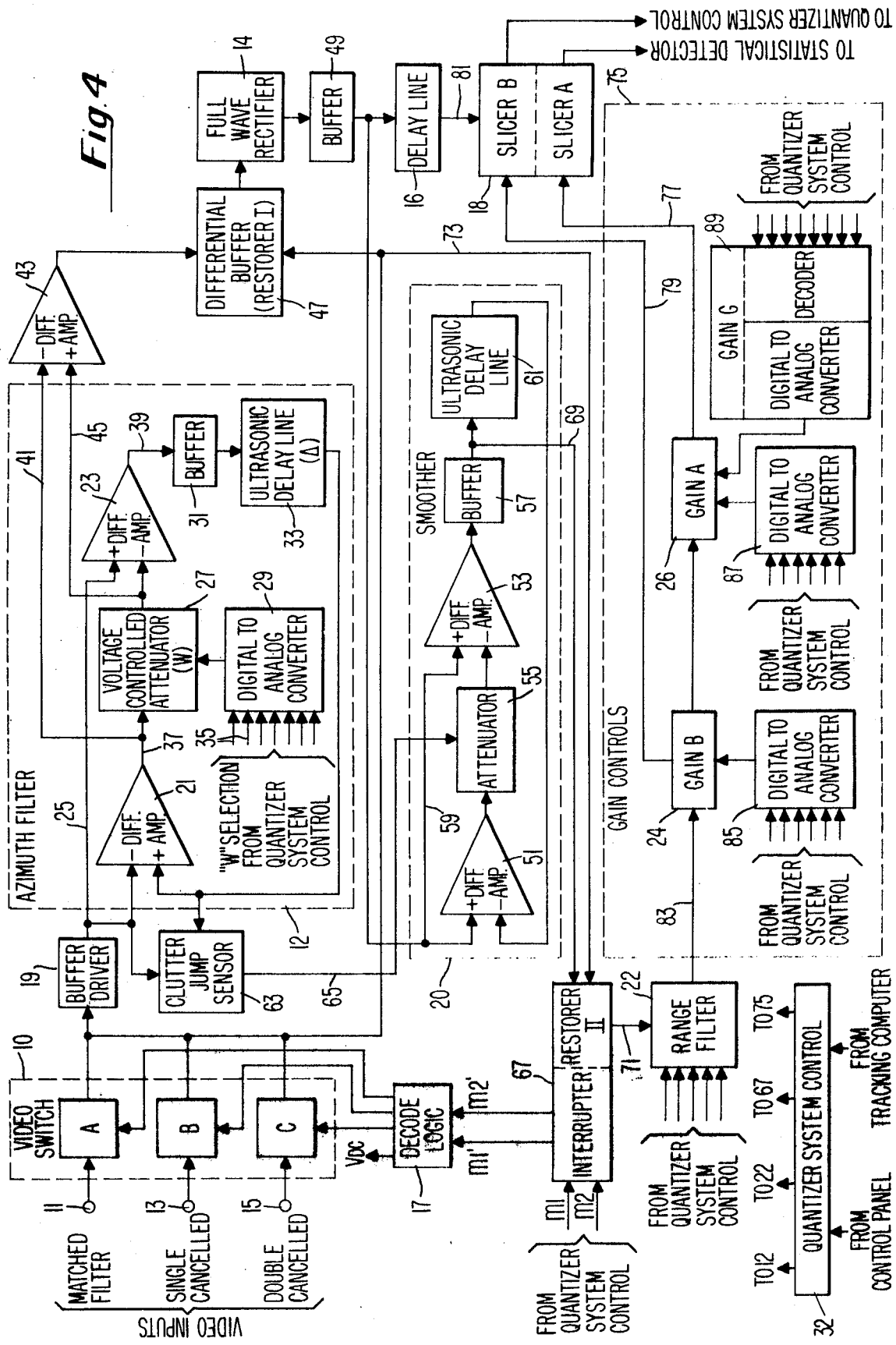
FIG. 4 is a detailed diagram of an actual operative embodiment of the quantizer system of the present invention.

With reference to an actual operative embodiment of the quantizer system depicted in FIG. 4, there are three input terminals 11, 13 and 15 which receive the radar video signals. The video appearing on said terminals is identified respectively as matched filter, single-cancelled and double-cancelled video. After level adjustment in in-line attenuators (not shown), the video signals are applied to the respective sections A, B and C of the Video Switch 10, which sections serve as electronic gates. A Decode Logic unit 17 is connected to each of the sections of the Video Switch. In response to a command from Quantizer System Control 32 the Decode Logic enables one of the sections of the Video Switch to select the video best suited for processing in each sector of the quantizer system. It should be understood that the selection of video inputs assumes that these video types are actually available to the quantizer system. If only one type is present, the Video Switch, Decode Logic and associated units may be eliminated. The video from the selected section of the Video Switch is applied through a Buffer Driver 19 to the Azimuth Filter 12. The Azimuth Filter comprises differential amplifiers 21 and 23, a coax delay line 25, a voltage controlled attenuator 27, a digital-to-analog converter 29, a buffer 31 and an ultrasonic delay line 33.

In operation, the selected video output from Buffer Driver 19 is applied directly to the minus (inverting) input terminal of amplifier 21 and through a coax delay line 25 to the plus (noninverting) input terminal of amplifier 23. Amplifiers 21 and 23 comprise an operational differential amplifier. The coax line 25 compensates for the circuit delays in the attenuator 27 and amplifier 21. The voltage-controlled attenuator 27 which utilizes a field effect transistor (FET), is used to establish attenuation or weight, W, on command of the digital-to-analog converter 29. The converter receives control bit information on lines 35 from Quantizer System Control 32 and converts them to the analog voltage for establishing weight, W, in the attenuator 27. The output signal of amplifier 21 appearing on line 37 is inverted by the attenuator 27 before being applied to the minus (inverting) terminal of amplifier 23. The output of amplifier 23 appearing on line 39 is applied to buffer 31 which is capable of driving the low impedance of the ultrasonic delay line 33. In an actual embodiment, the line is a precision oven-controlled quartz delay line with an electronically variable trimmer. The trimmer has a manual adjustment which allows the filter pulse repetition frequency (PRF) to be aligned with the radar PRF.

The theory of operation of the Azimuth Filter will be explained with reference to FIGS. 4 through 9 inclusive. The amplifiers identified by the Roman numerals I and II in FIG. 5 correspond respectively to Amplifiers 21 and 23 of FIG. 4. The attenuator, W, of FIG. 5 corresponds to Attenuator 27 of FIG. 4 with the exception that the former is assumed to perform its function ideally without the inversion of the signal produced in the latter. The coax delay line 25 of FIG. 4 corresponds to the line A in FIG. 5. The ultrasonic delay line 33 is represented by the block, Δ in FIG. 5.

The Azimuth Filter is a variable, high pass, sampled data filter which may be programmed to one of a plurality of cutoff frequencies. The choice of the cutoff frequency is based on the command of the information bits of the Quantizer System Control unit which are applied to lines 35 of the digital-to-analog converter 29.

Target or clutter at a given radar range, sampled at the PRF, may be considered as a doppler-modulated signal of frequency from zero to one-half PRF. The succession of returns from a target at a given range varies in amplitude as if modulated by a signal. In general, the modulation of returns due to aircraft will have a frequency somewhere between zero and one-half PRF depending on the radial velocity of the aircraft with the higher frequencies being more probable. Returns due to clutter, on the other hand, have zero- or low-frequency components. In general, these will be nonzero due to uncancelled platform motion and doppler residue due to side lobes and scanning of the radar antenna. The Azimuth Filter processes these returns at a given range in such a way as to remove low-frequency components in azimuth. In effect, it is a high-pass filter in azimuth along a given range circle.

When observing a single range increment, the output of a pulsed radar may be considered as a succession of samples taken at different azimuths. Given a particular range increment, and assuming that some moving target or object is present, the returns from this moving object will have a doppler frequency component which is a function of the relative rate of motion of radar and target, of the radar frequency and the PRF.

Figure 5:
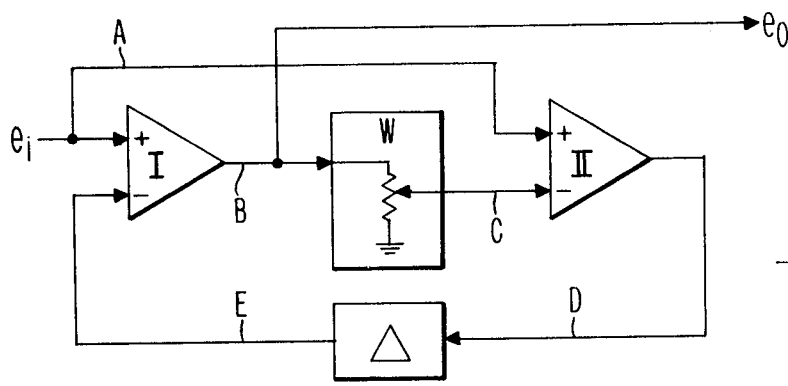
FIG. 5 depicts in operational form the azimuth filter of the quantizer system.
Figure 6A:
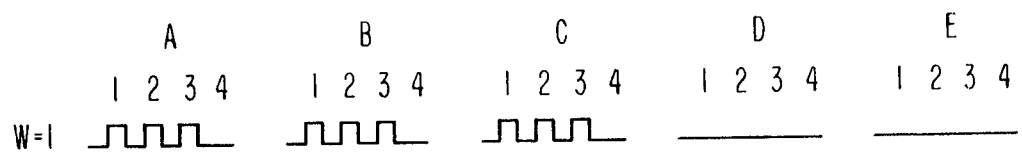
FIGS. 6a and 6b illustrate respectively various waveforms generated by the azimuth filter of FIG. 5 for three identical input signal pulses and for conditions of no attenuation and full attenuation.
Figure 6B:
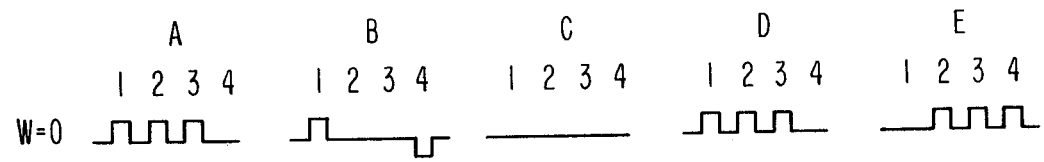

In FIG. 5 there is depicted the Azimuth Filter of the present invention in operational form. W is a weighting network which functions as a resistive attenuator. Δ is a delay line with a length 1/PRF. This delay line is assumed to have a gain of 1. In the operational diagram are shown two differential amplifiers, I and II, with the transfer function: $E_{out} = E_{in+}$, $E_{out} = -E_{in}$. FIGS. 6a and 6b depict the various waveforms for a signal consisting of three identical pulses occurring at the PRF, and for which the weighting W equals 1, in one case, and 0 in another case.

Our first consideration will be the case where W equals 1, that is, where the weight of 1 is equivalent to the setting of the attenuator for no attenuation. The first pulse enters the plus (noninverting) inputs of amplifiers I and II, and immediately appears unaltered at point B which is equivalent to $e_o$, the output voltage. The pulse passes unaltered through the attenuator W, as indicated at point C, to the minus (inverting) input of amplifier II. Since amplifier II has equal pulses at both of its input terminals, its output is $E_{out} = E_{in+} - E_{in-} = 0$, which is the voltage appearing at point D in FIG. 5. Hence the input to the Δ is 0, and the output of the delay line at point E is also zero. Consideration of PRF intervals 2 and 3 shows the identical result. Hence the train of pulses is passed unaltered through the filter as illustrated in FIG. 6a.

Further consideration of the foregoing demonstrates that the output of the Azimuth Filter is identical to the input regardless of the length of the pulse train as long as the pulses are coincident in range and identical in amplitude. Since a train of identical pulses is equivalent to sampling of a DC or zero frequency waveform, it is apparent that the filter passes all frequencies up to PRF/2 when W equals 1.

We shall now consider a second case in which W equals zero. A weight of zero is equivalent to setting the attenuator so that no signal passes. The first pulse (A) enters amplifiers I and II and immediately appears at (B) as the output. The pulse also immediately appears at point (D). There is no input at point (C) since W equals zero. The pulse appearing at (D) enters the delay line and appears 1/PRF later, precisely the time that the second pulse appears at point (A). Hence the second pulse and the delayed first pulse enter amplifier I simultaneously at equal amplitudes and effectively cancel each other so that there is no output at point (B). The same consideration applies to the pulse identified as 3. At interval 4, there is no input at point (A). However, delayed pulse 3 appears at point (E), the output of the filter, as illustrated in FIG. 6b. What appear to be an extra pulse will later be seen to be the equivalent, in a sampled-date high-pass filter, of differentiated leading and trailing edges.

If we extend the above analysis to a longer train of constant pulses, the same features described hereinbefore would be apparent. The first pulse applied to the filter appears unaltered at the output. No further pulses appear so long as there are pulses at the input. Finally, a negative image of the pulse appears 1/PRF after the last pulse. Since a long train of pulses is equivalent to sampling of DC, that is, zero frequency, the circuit appears as a high-pass filter. The analogy may be extended in that we may allow the leading and trailing edges of the pulse train to appear but not the "flat top" of differentiation.

Figure 7A:
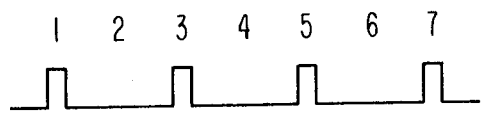
FIGS. 7a and 7b and 7c illustrate various waveforms associated with the transient behavior of the azimuth filter of FIG. 5.
Figure 7B:
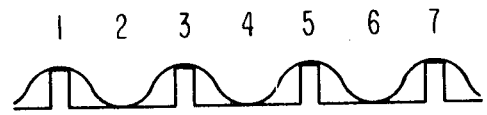

In the foregoing description of the mode of operation of the Azimuth Filter 12, consideration has been given to the transient behavior of the filter. With continued reference to the operational diagram of FIG. 5, and reference to FIGS. 7a and 7b consideration shall now be extended to the application of the filter to sampled sine waves. FIG. 7a depicts a succession of waveforms in which the numbered intervals are separated by 1/PRF. This set of signals may be considered the result of sampling a sine wave of frequency PRF/2 at a particular phase, as illustrated in FIG. 7b. It should be noted in the last-mentioned Figure that one sampled wave occupies two cycles of the PRF.

Figure 7C:
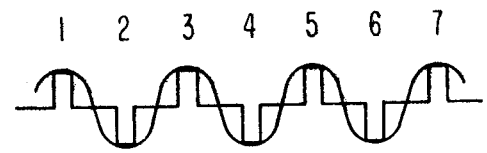

In considering the application of the Azimuth Filter to the waveform of FIG. 7b, and assuming that $W=1$, the first pulse appears at (A), (B), (C), but not at (D). During the second sampling interval no signal appears at (E), (A) or (B). Further analysis shows similar results for the remaining intervals. Hence it is apparent that the filter has no attenuation at PRF/2 for $W=1$. For $W=0$, the first pulse appears at (A), (B) and (D), but not at (E). During the second interval nothing appears at (A), but the delayed first pulse appears at (E), and hence appears inverted at (B), the output. Further analysis shows the result which is depicted in FIG. 7c. The superposed sine wave illustrates that the signal emerges unaltered in frequency but doubled in amplitude. This doubling in amplitude requires correction, as will be discussed hereinafter. However, for the moment, if the assumption is made that the doubling has been corrected by a factor ($1+W$)/2=½(for $W=0$), then for $W=1$ and $W=0$, it is noted that a sequence of sampled doppler frequency PRF/2 passes through the filter with no attenuation. As has been previously shown, for trains of pulses, it is apparent that the circuit is a high-pass filter for $W=0$ and passes all frequencies for $W=1$.

In completing the analysis of the operation of the Azimuth Filter, the case will next be considered where W is allowed to take on values between 1 and 0. Considering FIG. 8a, and a train of three pulses, the operation of the filter will be studied for $W=½$.

The first of the series of $e_k$ pulses enters the noninverting terminals of amplifiers I and II at point (A) with a value of 1 in the first PRF interval and emerges from amplifier I at point (B) as an $e_o$ with an amplitude 1. On emerging from the attenuator W it has an amplitude of ½. The output of amplifier II therefore is 1—½=½ at point (D). At the second PRF interval the second pulse enters (A) at amplitude 1. However, simultaneously the delayed first pulse (—½) emerges from the delay line, Δ, and enters the inverting input terminal of amplifier I. At point (B), the output, $e_o$, is equal to 1—½=½. The pulse of amplitude ½ then passes through the attenuator emerging with an amplitude ¼. The input of amplifier II is the second pulse of amplitude 1, and the pulse of amplitude ¼ so that at point (D) we have 1—¼=¾. At PRF interval 3, the third pulse enters amplifier I at point (A) at an amplitude 1. The delayed second pulse (E) emerges from the delay line at amplitude ¾ so that the output at (B) is 1—¾=¼. At interval 3, the output of the attenuator (C) is ⅛, and the output from amplifier II at point (D) is ⅞.

During the fourth PRF interval there is no input pulse, $e_i$, at point (A). However the delayed third pulse of amplitude ⅞ appears at the inverting input of amplifier I and appears at point (B), the output, as a pulse of amplitude —⅞. On passing through the attenuator it emerges at amplitude —7/16, and is inverted in amplifier II and subsequently emerges from the delay line at PRF interval 5 at point (E) as a pulse of amplitude 7/16. Again inverted in amplifier I it appears at (B) as a pulse of amplitude —7/16. The pulse continues to circulate through the delay line at the PRF, halving each time, until it becomes lost in noise. This is illustrated in FIG. 8b.

Having examined the azimuth transient response of the filter for three weights, namely, $W=1$, ½ and 0, it may be concluded that the Azimuth Filter behaves in a manner analogous to a high-pass filter of long, medium or short time constant, depending on the assigned weight, W. Furthermore, as in conventional filters, the behavior of the filter in the time domain, that is, the transient behavior, determines the behavior of the filter in the frequency domain or steady state behavior. Thus, the Azimuth Filter operates as a high-pass sampled-data filter at the PRF with cutoff frequency (3db. point) established by the magnitude of W.

FIG. 9 depicts the characteristic of a practical Azimuth Filter for different values of W and assumes that the correction $e_o(B)=(1+W)/2$. It should now be apparent that an Azimuth Filter with variable weight, W, and a variable cutoff frequency has extreme utility in the present quantizer system. Along a given radar range circle, it is possible to filter the radar video containing sampled doppler frequencies in such a way as to enhance the signal to clutter ratio for targets buried in clutter. Furthermore, due to the availability of a variable cutoff frequency it is possible to choose a cutoff frequency that provides the greatest suppression of clutter with the least suppression of target. The cutoff frequency may be varied to achieve an optimum by adjusting attenuation or weight, W.

The selection of the proper attenuation is provided by the Quantizer System Control. The selection of the proper Azimuth Filter is based upon a sample taken from any designated sector of the area under surveillance. The three conditions which govern the selection are as follows: (a) the present Azimuth Filter is removing a larger segment of the spectrum than is required to make the spectrum flat; (b) the spectrum is flat, the correct Azimuth Filter is being used; (c) an insufficient portion of the spectrum is being attenuated by the Azimuth Filter in use. The sample upon which the selection is based is obtained by counting the number of pairs of ONE's out of the Slicer B of block 18. The Quantizer System Control 32 determines whether or not the sample is within predetermined limits. The expected number of pairs which will be counted if the Slicer B outputs are independent is known for each sector. The thresholds on the pairs sample are set to within approximately one standard deviation of the expected number of pairs, that is, the mean. If the sample yields a count one standard deviation or less below the mean, an Azimuth Filter which rejects a smaller portion of the spectrum is used. If the count is within one standard deviation, the filter presently used is judged correct. If the sample results in a count one standard deviation or more above the mean, the noise is judged to be correlated and a filter which rejects a larger portion of the spectrum is inserted. The particular Azimuth Filter setting existing at the time of exiting from the sector, is stored in the memory portion of the Quantizer System Control 32, and is fetched from memory when the sector is again entered on the following scan.

With continued reference to FIG. 4, the output of amplifier 21 is applied by way of line 41 to the negative terminal of Differential Amplifier 43. Further, the output of the voltage controlled attenuator 27 appearing on line 45 is fed to the plus terminal of the Differential Amplifier 43. Stated more succinctly, the inputs to Differential Amplifier 43 are the signal output $e_o$ from the Azimuth Filter as well as the attenuated and inverted signal. The function of the Differential Amplifier 43 is to apply the correction factor $(1+W)/2$ which has been mentioned hereinbefore in connection with the operation of the Azimuth Filter.

The corrected signal appearing at the output of the Differential Amplifier 43 passes through a Differential Buffer (Restorer I) 47 which is part of the DC restoration function to be described hereinafter, and is full-wave rectified by Rectifier 14. The output of the rectifier is applied by way of Buffer 49 to the next major element of the quantizer system, namely, the Smoother 20. The Smoother comprises a pair of Differential Amplifiers 51 and 53, the Smoother Attenuator 55, Buffer 57, a Coax Delay Line 59, and an Ultrasonic Delay Line 61. It will be apparent that the configuration of the Smoother is similar to that of the Azimuth Filter described hereinbefore, except that the output of the former is taken from the output of the II Amplifier (FIG. 5) rather than from the I Amplifier (FIG. 5) as in the latter.

The output of Amplifier 53 of the Smoother is the complement of the output of Amplifier 51. In effect, the Smoother output may be obtained by subtracting the Azimuth Filter output from unity.

The Smoother is a low-pass sampled data filter, or integrator. Its function is to integrate or average in time the instantaneous amplitudes of receiver noise signals along a given radar range circle. Since the time integral of rectified noise approaches the RMS noise amplitude, it may be said that the Smoother produces an RMS measure of receiver noise along a given range circle. If the Smoother had a sufficiently long time constant the output for a white noise input, after a sufficiently large number of PRF periods, would be a DC level of amplitude equal to 0.885 times the RMS value of the video. It is necessary to establish an RMS noise estimate based upon measurements over small areas, because in a radar receiver the RMS residual clutter and noise varies as a function of range and azimuth.

The weighting network $W$ of the Smoother Attenuator 55 is switched to one of two weights, $W=0.5$ or $0.8$, (in a practical embodiment) by the Clutter Jump Sensor 63 acting by way of line 65. The change in the weighting provides a change in the time constant of the filter. With the weighting network at 0.5, the leading edges of clutter residue that pass through the Azimuth Filter are passed on ultimately to the slicer circuit where they cause a jump in the slicer threshold and thus inhibit the quantization of the clutter edge. At a weight of 0.8, the threshold changes more slowly; it is less effective in inhibiting the quantization of residual clutter edges. The weight, 0.8, is normally used because it results in an estimate of the mean of the residual clutter and noise which is based on a relatively large sample; hence, in the absence of clutter jumps it provides a more accurate measurement of the mean.

The Clutter Jump Sensor 63 mentioned in the preceding paragraph, receives a signal which is the same as that applied to the input of the Azimuth Filter, and a second signal which corresponds to the output of the ultrasonic delay line 33 of the Azimuth Filter. If the first pulse of a pulse train suddenly appears at the input to the Azimuth Filter, but has not yet appeared at the output of the delay line, and the pulse is of sufficient amplitude, the Clutter Jump Sensor responds by changing the weighting network of the Smoother from a weight of 0.8 to a weight of 0.5. Later, when the delayed output reaches an amplitude close to the input amplitude, the Smoother weight is restored to 0.8. At the end of the pulse train, when there are no pulses at the input to the Azimuth Filter, but there are still pulses of sufficient amplitude at the output of the delay line, the Smoother weight is again changed to 0.5 until the delayed output falls to a negligible level. This operation assures optimum cancellation of discontinuities (jumps) in the clutter amplitude.

The next element employed in the particular quantizer system being described is the DC restorer. The DC restorer comprises Restorer I (the Differential Buffer 47), and Restorer II and Interruptor 67, which are coupled to each other by way of line 73. The purpose of the DC Restorer is to reestablish the reference level of the input signal which is lost because of the capacitor-coupled circuits in the analog portion of the quantizer system.

As mentioned hereinbefore, there are three video signals available as inputs to the quantizer. These are the matched filter, single-cancelled, and double-cancelled video. Which signal is chosen is a function of the logical state of the $m1$ and $m2$ control bits furnished by the Quantizer Control System 32. The $m1$ and $m2$ control bits are applied to the interruptor generator which provides the $m1'$ and $m2'$ signals which are applied to the Decode Logic Unit 17. During the restoration interval, no matter which input is selected, $m1'$ and $m2'$ are forced to a predetermined code. It should be noted that the restoration interval occurs every sweep and that it starts at a time corresponding to maximum range and lasts for, a predetermined period. At all other times $m1'$ and $m2'$ are the same as $m1$ and $m2$, respectively. The $m1'$ and $m2'$ signals are decoded in the Logic Unit 17 into the four lines which select one of the three inputs of the Video Switch 10. The fourth input which is selected only during the restoration interval is a DC level which corresponds to 0 volts at the input. Therefore, the output of the Video Switch 10 for one sweep consists of the selected video signal up to maximum range and a DC level from maximum range to a predetermined range into the succeeding sweep.

The selected video is applied to the Azimuth Filter where it loses its DC level. The output of the Azimuth Filter is applied by way of Differential Amplifier 43 to Restorer I (Differential Buffer 47), which is a clamping circuit and establishes the DC level occurring during the restoration interval at 0 volts.

The output of the Full-Wave Rectifier 14 is applied by way of Buffer 49 to the Smoother 20. Since the Smoother circuits are also capacitor-coupled, the output of the Smoother appearing on line 69 is applied to Restorer II, for DC restoration. The output of Restorer II appearing on line 71 is applied to the Range Filter 22 and Gain Controls 75 of the quantizer system. The outputs of the latter appear respectively on lines 77 and 79, and are applied to the Slicers A and B, 18. These outputs have a common reference with the signal emanating from Restorer I and applied by way of Buffer 49 and Delay Line 16 to the input line 81 of Slicers A and B.

Continued reference to the diagram of FIG. 4 for the quantizer system indicates that the output of Restorer II, is applied to the next major portion of the system—the Range Filter 22, by way of line 71. The function of the Range Filter will next be described with the aid of FIGS. 10 and 11 and 12.

The output of a conventional filter is a function of the instantaneous input signal and of values of the input signal in the past. A simple, low-pass RC filter is an example of this. The Range Filter used in the quantizer system is a low-pass filter but it is unique in that not only is its output a function of present and past information, but it is also a function of future information relative to the video on line 81, the input to the slicers. This latter function is accomplished by the use of a tapped delay line. The result of the use of such a delay line is a zero-phase shift, low-pass filter having as its function the removal of clutter in range. Since clutter is of low frequency content, the Range Filter will pass, rather than remove, this clutter. Reference to FIG. 10 however, indicates that the output of the filter is subtracted from the unfiltered input video, thereby removing the clutter.

Figure 11:
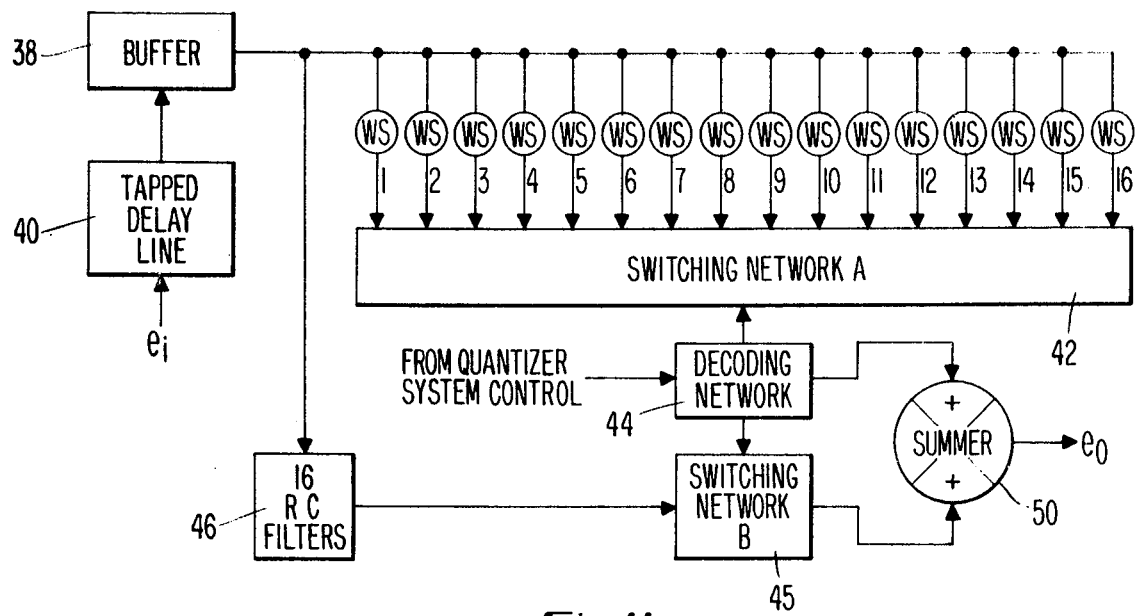
FIG. 11 is a functional schematic diagram of the range filter.

The filtering provided by the Range Filter is also variable. It is possible to select one of 16 filters in an actual operative embodiment, each having a different time constant, thereby permitting more or less of the frequency spectrum to be passed through the filter. In this way, the filter can be adapted to the range clutter in a particular sector. FIG. 11 depicts a functional schematic of the Range Filter. The input signal from the DC Restorer section enters a delay line which has 10 taps and an output. If the output of the delay line is considered to be present time, it becomes apparent why it is possible to have access to future video.

Figure 12:
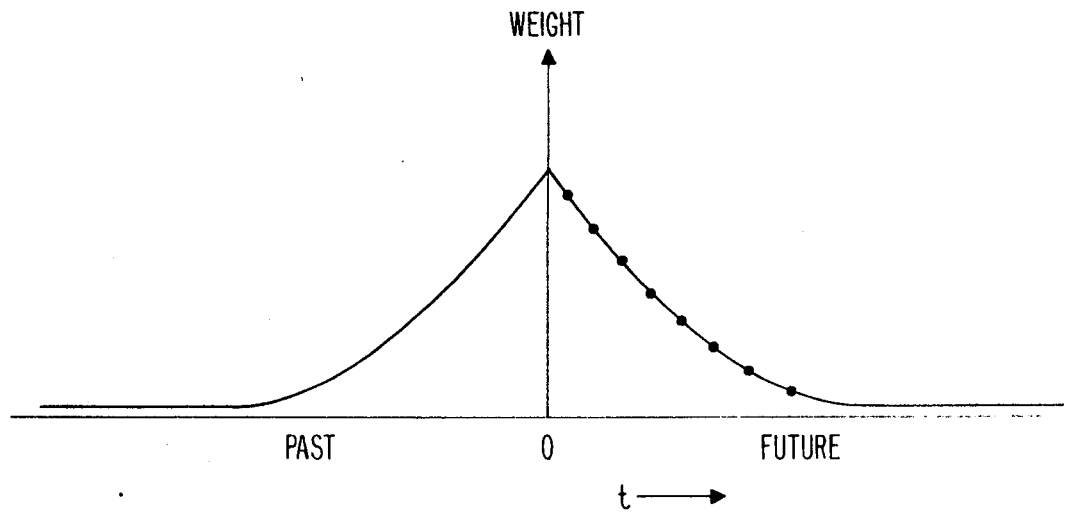
FIG. 12 illustrates the weighting characteristic of the range filter.

Before continuing with the discussion of the operation of the Range Filter, it is helpful to analyze the characteristics of a low-pass, RC filter. The response of such a filter to a unit impulse is given by the equation: $e_o = 1/T \times e^{1/t/T}$, where $T$ is the time constant of the filter. Since a unit impulse occurs only at time $t=0$, it can be seen from the equation that the filter gives a larger weight to present events than to events happening in the past. This condition may be expressed in the graph of FIG. 12, considering the present as coinciding with the ordinate axis. If the time constant of the circuit is different, the initial value and shape of the curve will also be different. In order to process the video in the future, we use the mirror image of the curve depicted to the right of the "present" axis in FIG. 12. But since we have only a finite number of taps, the mirror image cannot be a continuous function and is therefore an approximate image. A plot of this weighting scheme is shown in FIG. 12, commencing with the "present" axis and proceeding to the right or future. Here again, the time constants can be changed by varying the relative weights.

Returning to our consideration of the operation of the Range Filter, and with reference to FIG. 11, the video input signal enters the tapped delay line 40. Each of the 10 taps, including the output, feed integrated circuit buffers indicated by the Buffer 38 whose function is to present minimal loading, make up for any losses in the delay line, and drive the succeeding circuits. In actual practice, there are more than 11 buffers, for in some instances two or three buffers are required for one tap. For the present discussion, however, it will be sufficient to consider one buffer per tap. The output of the buffers feed 16 weighted summers, designated WS with the notations 1 through 16 inclusive. Consider the weighted summer WS1. Its inputs are the buffered taps of the delay line. Each input is weighted in the manner shown in FIG. 5 for the weighting associated with the Azimuth Filter. These weighted inputs are then summed to form the low-pass filtering in the future. Weighted summers WS2 through WS16 function identically with the exception that their weights are changed to produce different time constant filters. In certain cases the weights are zero. Therefore a weighted summer may not receive all 11 taps.

Selection or Switching Network A, 42, receives the 16 future video signals and selects one on command of the Decoding Network 44 under direction of the Quantizer System Control 32. The output therefrom is therefore the selected future video. To achieve filtering in the past, the buffered output of the delay line, present video, is fed into 16 RC filters 46, each having time constants which correspond to the time constants of the filters which operate on future video. The output of each RC filter is past filtered video.

Switching Network B, 45, receives the 16 filtered video signals from the RC filters and selects one as dictated by the Decoding Network 44. The output of the Switching Network B is therefore a selected past filtered video.

The Decoding Network 44 receives a four-bit code from Quantizer System Control 32 and transforms it into the number of lines needed to operate Switching Networks A and B. The 16 possible states of the four-bit code correspond to the 16 different time constant filters. It is important to note that the future and past filters cannot be selected independently. That is, selected future and past filters have always the same time constant.

In order to obtain the output of the Range Filter, selected future filtered video and selected past filtered video are summed together in the Summer 50 resulting in zero phase shift, filtered video, as $e_o$.

In order to select the optimum value of range filter, an estimate of the correlation in range of the video is obtained by sampling the output of Slicer B of 18 and comparing it to its output at some range cell in the past. Assuming that Slicer B is regulated to produce a predetermined "$p_n$" (the probability of a ONE being generated by the quantizer due to noise alone) it is possible to determine the probability of the existence of a ONE at both the present and selected past cell. The mean value of the count of the numbers of pairs of ONE's obtained by comparing present and past outputs of Slicer B is known for uncorrelated video. If the count is within one standard deviation of this mean value, the range filter presently being used is judged to be the correct filter. If the sample produces a count one standard deviation or more above the mean, the range filter is judged to be inadequate for the clutter situation and a range filter is introduced which attenuates a larger portion of the spectrum. Conversely, if the count is one standard deviation or more below the mean, the decision is made that too much of the spectrum is being cancelled by the range filter in use and another filter which introduces attenuation over a smaller portion of the spectrum is called into use. As in the case of the azimuth filter data, the value of the range filter is stored in the memory of the Quantizer System Control 32 at the end of the sector and is fetched when the sector is again entered.

With continued reference to FIG. 4, the video output of the Range Filter 22 appearing on line 83 is operated upon by the Gain Controls 75 which comprise Gain B, 24, Gain A, 26, and Gain G, 89. At the start of each sector sweep, that is, the sector deviation of a single sweep, the Gain B and Gain A information is read from the memory portion of the Quantizer System Control 32 is used in conjunction with Digital to Analog Converters 85 and 87 to set the respective Gain B and Gain A adjustments for the duration of the sector sweep. The Gain A unit, in addition to receiving an input from Gain B also receives an input from Gain G which provides a nominal gain setting corresponding to a command to the quantizer system to regulate the Slicer A output to a particular value. The command may come from the Control Panel 34 (FIG. 1) or from the Tracking Computer 36 (FIG. 1). The Gain A and Gain B units are utilized to control the clip level applied to the Slicers A and B, 18.

In an operating system, the selections of the values of Gain A and Gain B are made in the following manner. Each odd numbered sweep, a sample of the rate at which Slicer A is generating ONE's (which occurs whenever the video input thereto exceeds the clip level) is obtained by counting the number of ONE's generated by Slicer A as the sweep passes through the sector. In conjunction with the input provided by Gain G as discussed hereinbefore, the expected number of ONE's on any sweep may be predicted and compared with the actual number of ONE's counted. If the sample count is statistically within limits, Gain A is considered to be correct and is not altered. If the actual count is lower than expected, Gain A is judged to be high and is reduced. If the sample count is judged to be high, Gain A is judged to be low and is increased (raising the threshold on Slicer A) in order to lower the rate at which ONE's are generated by Slicer A in this sector. When the sector is exited, the updated value of Gain A is stored in the memory section of the Quantizer System Control 32 to be used as a starting value when the sector is again entered.

With regard to the overall sensitivity of the quantizer system, Gain G and Gain A provide the gain or factor by which the mean of the noise distribution must be multiplied to achieve the desired "$p_n$." When a command is received either from the Control Panel 34 or the Computer 36 by way of the Quantizer System Control 32, to regulate the output of a Slicer A to a certain rate, a nominal or coarse gain setting is inserted in Gain G. Corrections to this nominal value are made if the estimate indicates that the desired rate is not being achieved. Such corrections result from the vernier or fine gain setting provided by Gain A, particularly when controlled by the feedback loop including the computer 36. Thus, the gain provided by Gain A adds to that initially provided by Gain G to achieve the command "$p_n$." It should be noted that "$p_n$" is relatively insensitive to steps in Gain A since each step corresponds to a very small incremental change in gain. The "$p_n$" gain parameters for each sector are also stored in memory.

With respect to the selection of the value of Gain B, which regulates the threshold of Slicer B, during every even sweep through a sector except sweeps which are a multiple of 16, a sample of the number of ONE's out of Slicer B is obtained. Slicer B differs from Slicer A in having been assigned to regulate "$p_n$" to a fixed value, rather than the variable "$p_n$" selectable for Slicer A by way of the action of Gain G. If the sample taken from Slicer B is not statistically within desired limits, the Gain B is modified. Otherwise, it is left unchanged. Slicer B is used only to obtain the pairs estimates which are measures of the correlation of the video. Since "$p_n$" is held constant at the output of Slicer B, the desired pairs count is fixed. Use of Slicer B, therefore, obviates the need for varying the test on the pairs count when the "$p_n$" command to the Quantizer System is changed. Only the threshold to Slicer A is affected by the "$p_n$" command from the tracking computer or the control panel.

It will be apparent from the foregoing description and its mode of operation that there is provided an improved system for the automatic elimination of clutter from radar video signal returns without sacrificing the optimum sensitivity needed for the detection of targets.

What is claimed is:

1. A quantizer system for the elimination of clutter from the signal returns in surveillance and delection systems comprising in combination,
   quantizer system control means for subdividing the area under surveillance into a plurality of sectors,
   means for receiving signal returns indicative of the surveillance of a given one of said sectors,
   filter means capable of establishing the signal bandwidth in both range and azimuth and operatively connected to said receiving means for filtering said signal returns,
   slicer means coupled to said filter means and providing output signals for use in obtaining an estimate of "$p_n$" and estimates of the correlation in both range and azimuth for said signal returns,
   gain means operatively connected to said filter means and to said slicer means for establishing desired thresholds for said slicer means,
   adaptive control means including said quantizer system control means coupled to said filter means for providing the selection of values therefor in both range and azimuth and to said gain means for causing the latter to provide the gain factors associated with said desired thresholds for said slicer means, whereby the desired "$p_n$" and correlation of the quantizer system output signals is achieved, and
   memory means included within said quantizer system control means for storing the parameters of gain factors and range and azimuth filter values for a particular sector when the surveillance of said last mentioned sector is completed for the present scan, said parameters serving as initial control settings in the quantizer system when the surveillance of the same sector is again initiated during a succeeding scan.

2. A quantizer system as defined in claim 1 wherein said surveillance system is a radar system and said area under surveillance is subdivided into a predetermined number of annular sectors.

3. A quantizer system as defined in claim 1 wherein said filter means comprise an azimuth filter for weighting the signal returns of the present scan with the azimuth filter output signals stored in said memory means at the same range on the previous scan of a given sector, the passband of said azimuth filter being a function of the relative weight given the present signal return and the output of the filter at the same sector location on the previous scan of the sector,
   said filter means further comprising a range filter for providing symmetrical weighting on both future and past signal returns relative to the particular sector being scanned by the surveillance system.

4. A quantizer system as defined in claim 1 wherein said adaptive control means includes in a closed feedback loop said quantizer system control means, a control panel and a tracking computer, said quantizer system control means being coupled to said control panel and said tracking computer and being adapted to receive commands therefrom, said quantizer system control means being further coupled to said quantizer system and providing in response to said commands the automatic selection of filters and gain factors in said quantizer system.

5. A quantizer system as defined in claim 4 wherein said gain means comprises Gain G unit means under control of said quantizer system control unit and responsive to a "$p_n$" command originated selectively within the control panel and the tracking computer, said "$p_n$" command providing for the regulation of the output of the quantizer system to a predetermined output signal rate, said Gain G unit providing a nominal gain to approach such rate, a Gain A unit coupled to said Gain G unit and acting as a vernier for producing small increments of gain which when added to said nominal gain supplied by said Gain G unit, generates the gain factor needed to achieve the desired rate, said gain means further comprising a Gain B unit.

6. A quantizer system as defined in claim 5 wherein said slicer means includes a first slicer unit coupled to said Gain A unit, the output signal rate of said quantizer system being a function of the clip level applied to said first slicer by said Gain A unit, said clip level being dependent upon the gain factor generated by the combined action of said Gain A and Gain G units.

7. A quantizer system as defined in claim 6 wherein said slicer means includes a second slicer unit coupled to said Gain B unit, the correlation of the output signals in range and azimuth of said quantizer system being a function of the clip level applied to said second slicer by said Gain B unit, said clip level being dependent upon the gain factor generated by said Gain B unit, the "$p_n$" at the output of said second slicer unit being regulated to a constant value.

8. A quantizer system as defined in claim 1 wherein said means for receiving signal returns includes a video switch comprising a plurality of sections, each of said sections being adapted to receive one of three types of signal returns identified respectively as matched filter, single-cancelled and double-cancelled, decode logic means responsive to said quantizer system control unit for selecting one of said sections and thereby providing the type of signal return which in combination with the selected value of azimuth filter produces the desired correlation measurement at the output of said quantizer system,
   said memory means storing in addition to the parameter of gain factors and filter values, the parameter of type of signal return to be processed by the quantizer system in a particular sector under surveillance.

9. A quantizer system for the elimination of clutter from the signal returns in radar systems comprising in combination, quantizer system control means for subdividing the area under surveillance into a plurality of annular sectors, video switch means for receiving radar video signal returns indicative of the sweep of a given one of said sectors, azimuth filter means coupled to said video switch means and adapted to receive the video signal returns appearing as the output thereof, said quantizer system control means being coupled to said azimuth filter means, said azimuth filter means providing a high pass, sampled data filter having a filter characteristic determined by a command to said azimuth filter means by said quantizer control means, full-wave rectifier means coupled to said azimuth filter means for rectifying the filtered radar video signal returns appearing at the output of said azimuth filter means, thereby generating unipolar radar video signals, delay means for providing a predetermined delay to the unipolar filtered video signal returns, slicer means coupled to said delay means for providing quantizer system output signals at a rate determined by the parameters of said system, smoother means coupled to said full-wave rectifier means and adapted to receive the output unipolar video returns therefrom, said smoother means being a low-pass sampled date filter which serves to average in time the instantaneous amplitudes of radar receiver noise signals inherent in said video returns along any given radar range circle, range filter means coupled to said smoother means and adapted to receive the output signals therefrom, said quantizer system control means being coupled to said range filter means, said range filter means providing a zero-phase shift, low-pass filter for removing clutter in range from the radar video signal returns and having a filter characteristic determined by a command to said range filter means by said quantizer control means, gain means coupled to said range filter means and adapted to receive the output signals therefrom, said quantizer system control means being coupled to said gain means, the output of said gain means as determined by command of said quantizer control means being applied to said slicer means and establishing therein reference levels for providing a desired signal output rate from said quantizer system and the desired correlation of said signal output in both range and azimuth.

10. A quantizer system as defined in claim 9 wherein said video switch comprises three sections operatively connected to receive respectively matched filter, single-cancelled and double-cancelled radar video signal returns, decode logic means responsive to said quantizer system control means for selecting that section of said video switch associated with the type of radar video signal returns which when processed in accordance with said azimuth filter characteristic provide the desired correlation in azimuth for the output of said quantizer system.

11. A quantizer system as defined in claim 9 wherein said azimuth filter means comprises first and second differential amplifiers each having a pair of input terminals and an output terminal, means for applying the output signal from said video switch means to a first input terminal of said first amplifier, variable attenuator means coupling the output terminal of said first amplifier to a first input terminal of said second differential amplifier, means coupling said first input terminal of said first amplifier to the second input terminal of said second amplifier, delay line means coupling the output terminal of said second amplifier to the second input terminal of said first amplifier, and digital to analog converter means coupled to said variable attenuator means and responsive to commands from said quantizer system control means for providing an analog voltage representative of the attenuation characteristic required to be provided by said variable attenuation means, the output signal of said azimuth filter means appearing at the output terminal of said first differential amplifier.

12. A quantizer system as defined in claim 11 wherein said smoother means comprises first and second differential amplifiers each having a pair of input terminals and an output terminal, means coupling the output signal from said azimuth filter means to a first input terminal of said first differential amplifier, variable attenuator means coupling the output terminal of said first amplifier to a first input terminal of said second differential amplifier, means coupling said first input terminal of said first amplifier to the second input terminal of said second amplifier, delay line means coupling the output terminal of said second amplifier to the second input terminal of said first amplifier, the output signal of said smoother means appearing at the output terminal of said second differential amplifier.

13. A quantizer system as defined in claim 12 further including clutter jump sensor means having a pair of input terminals coupled respectively to the first and second input terminals of said first differential amplifier of said azimuth filter means and an output terminal coupled to said variable attenuator means of said smoother means, said clutter jump sensor means being responsive to radar video signals appearing on its input terminals indicative of a clutter edge and providing a command to said variable attenuator means for selecting the attenuation weight which is effective in increasing the threshold of said slicer means, thereby inhibiting the quantization of said clutter edge.

14. A quantizer system as defined in claim 9 wherein said range filter means comprises a tapped delay line, buffer means coupled to each of the taps of said delay line, a plurality of weighted summer filters and a plurality of RC filters connected in common to the outputs of said buffer means, the outputs of said weighted summer filters and said RC filters representing respectively future and past video, a pair of switching networks coupled respectively to the pluralities of filters, decoding network means coupled in common to said switching networks and being responsive to commands from said quantizer system control means, which commands specify a filter time constant common to both said weighted summer and RC filters, said decoding network thereby selecting a single filtered video signal from each of said last-mentioned pluralities of filters, and means for summing together the selected future and past filtered video signals, thereby generating zero phase shift filtered video as the range filter output.

UNITED STATES PATENT OFFICE
CERTIFICATE OF CORRECTION

Patent No. __3,611,369__      Dated __October 5, 1971__

Inventor(s) __Hugh T. Maguire__

It is certified that error appears in the above-identified patent and that said Letters Patent are hereby corrected as shown below:

Col. 4, line 7, the equation should read -- $e^{-t/T}$ --.

Col. 6, line 62, the equations should read

-- $E_{out} = E_{in+}$ , $E_{out} = -E_{in-}$ --.

Col. 6, line 75, the equation should read

-- $E_{out} = E_{in} + -E_{in-} = 0$ --.

Col. 11, line 27, the equation should read

-- $e_o = 1/T \times e^{-t/T}$ --.

Signed and sealed this 23rd day of May 1972.

(SEAL)
Attest:

EDWARD M. FLETCHER, JR.
Attesting Officer

ROBERT GOTTSCHALK
Commissioner of Patents